US008111231B2

(12) United States Patent
Sagawa et al.

(10) Patent No.: US 8,111,231 B2
(45) Date of Patent: *Feb. 7, 2012

(54) DISPLAY METHOD FOR LIQUID CRYSTAL PANEL, AND DISPLAY APPARATUS

(75) Inventors: Takahiro Sagawa, Chino (JP); Kesatoshi Takeuchi, Shioziri (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

This patent is subject to a terminal disclaimer.

(21) Appl. No.: 12/292,680

(22) Filed: Nov. 24, 2008

(65) Prior Publication Data

US 2009/0115717 A1     May 7, 2009

Related U.S. Application Data

(63) Continuation of application No. 11/218,493, filed on Sep. 6, 2005, now Pat. No. 7,471,277.

(30) Foreign Application Priority Data

Sep. 13, 2004  (JP) ................................ 2004-264976
Jul. 13, 2005  (JP) ................................ 2005-204885

(51) Int. Cl.
G09G 3/36 (2006.01)
(52) U.S. Cl. ............................ 345/98; 345/99; 345/100
(58) Field of Classification Search ............ 345/87–100, 345/204
See application file for complete search history.

(56) References Cited

U.S. PATENT DOCUMENTS

| 6,512,505 | B1 | 1/2003 | Uchino et al. | |
| 7,119,778 | B2 | 10/2006 | Yamashita et al. | |
| 7,126,574 | B2 | 10/2006 | Uchino et al. | |
| 7,173,599 | B2 | 2/2007 | Nishimura | |
| 7,215,308 | B2* | 5/2007 | Orii et al. | 345/87 |
| 7,265,741 | B2 | 9/2007 | Kumamoto et al. | |
| 7,471,277 | B2* | 12/2008 | Sagawa et al. | 345/98 |
| 2003/0030607 | A1 | 2/2003 | Kitagawa et al. | |
| 2003/0206149 | A1* | 11/2003 | Yamashita et al. | 345/92 |
| 2004/0104881 | A1 | 6/2004 | Furuya | |
| 2004/0246242 | A1 | 12/2004 | Sasaki | |
| 2005/0259064 | A1 | 11/2005 | Sugino et al. | |
| 2006/0158410 | A1 | 7/2006 | Fujine | |

FOREIGN PATENT DOCUMENTS

| JP | A-63-41829 | 2/1988 |
| JP | A-9-127917 | 5/1997 |
| JP | A-10-83169 | 3/1998 |
| JP | A-10-171421 | 6/1998 |
| JP | A-11-109921 | 4/1999 |
| JP | A-2000-122596 | 4/2000 |
| JP | A-2000-267067 | 9/2000 |
| JP | A-2001-166280 | 6/2001 |
| JP | A-2001-296841 | 10/2001 |
| JP | A-2002-323876 | 11/2002 |

(Continued)

*Primary Examiner* — Regina Liang
(74) *Attorney, Agent, or Firm* — Oliff & Berridge, PLC

(57) ABSTRACT

A display method for a liquid crystal panel is provided. The method includes a step of scanning pixels, arranged in a matrix, in an horizontal direction and in a vertical direction, to write video signals, thereby performing display; and a step of delaying the vertical-direction scanning for writing the video signals by a predetermined amount of time and writing a first predetermined fixed-level signal to all pixels in a row specified by the vertical-direction scanning delayed by the predetermined amount of time, in a predetermined time in the horizontal blanking period, thereby performing display.

5 Claims, 12 Drawing Sheets

FOREIGN PATENT DOCUMENTS

| | | |
|---|---|---|
| JP | A-2003-280617 | 10/2003 |
| JP | A-2004-061552 | 2/2004 |
| JP | A-2004-126293 | 4/2004 |
| JP | A-2005-043829 | 2/2005 |
| WO | WO 03/032288 A1 | 4/2003 |
| WO | WO 2004/070697 A1 | 8/2004 |

* cited by examiner

16: LIQUID CRYSTAL CELL ARRAY

IMAGE INPUT TO DISPLAY PANEL

DISPLAY METHOD FOR LIQUID CRYSTAL PANEL, AND DISPLAY APPARATUS

This application is a continuation of U.S. patent application Ser. No. 11/218,493, filed Sep. 6, 2005, the entire contents of which are hereby incorporated by reference.

The entire disclosure of Japanese Patent Application No. 2004-264976, filed on Sep. 13, 2004 and Japanese Patent Application No. 2005-204885, filed on Jul. 13, 2005, are expressly incorporated by reference herein.

BACKGROUND

1. Technical Field

The present invention relates to display methods for liquid crystal panels and display apparatuses. More specifically, the present invention relates to an improvement in reducing moving-image blur resulting from a residual image on a liquid crystal panel.

2. Related Art

For example, in active-matrix liquid crystal panels, a liquid-crystal response rate, particularly, a half-tone response rate is smaller than 16.7 ms, which is the time of one frame. Thus, when a moving image is displayed, a residual image may be seen. Also, when thin-film transistors (TFTs) are not selected, data signals written to corresponding pixels are continuously held. Thus, even if the liquid-crystal response rate is increased, a residual image remains on the retinas, since the viewer's line of sight tracks a moving image. Such a residual image resulting from a displayed moving image causes the so-called "moving-image blur", thereby reducing the display quality.

In order to overcome the problems described above, for example, Japanese Unexamined Patent Application Publication No. 11-109921 (Patent Document 1) discloses a liquid crystal display method. In the method, a screen is split into two screens, i.e., an upper screen and a lower screen. In the first half of a frame period, the upper screen is scanned with signals and the lower screen is simultaneously scanned with a black (blanking) signal, and in the last half of the frame period, the upper screen is scanned with the black (blanking) signal and the lower screen is simultaneously scanned with signals.

However, the liquid-crystal display method disclosed in Patent Document 1 has some problems. Specifically, since output control for switching between video signals and the black signal are required, the control is complicated. Further, a period in which video is displayed and a period in which black is displayed are fixed to the same period, i.e., are each fixed to one half a frame period.

SUMMARY

An advantage of some aspects of the invention is to provide a liquid-crystal-panel display method that allows, at least, arbitrary setting of the ratio between video display and non-video display, and to provide a display apparatus incorporating the method.

An aspect of the invention provides a display method for a liquid crystal panel. The method includes a step of writing, in a predetermined time in a horizontal blanking period in a predetermined horizontal period, a first predetermined fixed-level signal to, of pixels arranged in a matrix, all pixels in a predetermined row that is different from a row of pixels to which video signals are written in the horizontal period. According to an aspect of the invention, since the first predetermined fixed-level signal is written to all pixels in a predetermined row that is different from a row of pixels to which video signals are written, the ratio between video display and display based on the first predetermined fixed-level signal can be arbitrarily set. According to an aspect of the invention, the first predetermined fixed-level signal refers to a signal at a black level or at a color level analogous thereto and does not have to be at a strictly black level. Thus, the first predetermined fixed-level signal may be at a level that provides a similar effect.

An aspect of the invention provides another display method for a liquid crystal panel. The method includes a step of scanning pixels, arranged in a matrix, in an horizontal direction and in a vertical direction, to write video signals, thereby performing display; and a step of delaying the vertical-direction scanning for writing the video signals by a predetermined amount of time and writing a first predetermined fixed-level signal to all pixels in a row specified by the vertical-direction scanning delayed by the predetermined amount of time, in a predetermined time in the horizontal blanking period, thereby performing display. According to an aspect of the invention, the pixels arranged in a matrix are scanned in the horizontal direction and the vertical direction to write the video signals, and this method is the same as a typical video-signal display method. In this state, if nothing is done until the next frame, the display based on the video signals is maintained until the next frame. However, according to an aspect of the invention, after a predetermined time, (e.g., one-half a frame period in embodiments described below), the first predetermined fixed-level signal is written to the pixels for each row and the processing is repeated in the vertical direction. Thus, since the first predetermined fixed-level signal is written to pixels to which video signals have been written, display by pixels based on video signals is restricted by the above-mentioned predetermined time. It is, therefore, possible to arbitrarily set the ratio between display based on video signals and display based on the first predetermined fixed-level signal. For example, when the above-mentioned predetermined time is reduced, the time of display based on video signals is reduced to thereby allow a reduction in residual image. Also, when the predetermined time is increased, the time of display based on video signals is increased.

In the display method according to an aspect of the invention, preferably, the predetermined amount of time for delaying the vertical-direction scanning is determined in accordance with a scene-mode switching signal or a movement amount of an entire image expressed by the video signals. According to an aspect of the invention, since the timing of writing the first predetermined fixed-level signal is adjusted in accordance with the scene-mode switching signal (e.g., a signal specifying a video genre, such as a movie or sport) or the movement amount of an entire image expressed by the video signals, the ratio between display based on video signals and display based on the first predetermined fixed-level signal can be appropriately set in accordance with video content. In particular, when display based on the first predetermined fixed-level signal is excessive, flicker is likely to occur. However, according to an aspect of the invention, since display based on the first predetermined fixed-level signal is set in accordance with video content, the occurrence of flicker is minimized.

In the display method according to an aspect of the invention, preferably, the first predetermined fixed-level signal is simultaneously written to all pixels in a corresponding row. Thus, according to an aspect of the invention, the first predetermined fixed-level signal can be simultaneously written to all pixels in a corresponding row in a predetermined time in the horizontal blanking period.

In the display method according to an aspect of the invention, preferably, the video signals are set to be at a predetermined fixed level in a predetermined time in the horizontal blanking period and the video signals at the predetermined fixed level are used as the first predetermined fixed-level signal. Thus, according to an aspect of the invention, output control for switching between video signals (significant video signals) and the first predetermined fixed-level signal is not required.

In the display method according to an aspect of the invention, preferably, the video signals are set to be at the first predetermined fixed level and a second predetermined fixed level in the horizontal blanking period and, during the writing of the video signals, after the first predetermined fixed-level signal is written to the pixels, the second predetermined fixed-level signal is written. The second predetermined fixed-level corresponds to the so-called "precharge level" and the precharge-level signal is pre-written to ensure that significant video signals are written to the pixels of the liquid crystal panel. According to an aspect of the invention, since the second predetermined fixed-level signal is written after the first predetermined fixed-level signal is written, the second predetermined fixed-level signal is stably written. That is, since the first predetermined fixed-level signal has a potential at the overshoot side relative to the second predetermined fixed-level signal, writing a voltage with a slight overshoot and then shifting to the second fixed level stabilizes writing of the second predetermined fixed-level signal.

An aspect of the invention provides a display apparatus. The apparatus includes a liquid-crystal cell array having pixels arranged in a matrix and active elements for driving pixels; a data-line drive circuit that scans data lines, connected to the active elements in a column direction, to supply video signals; and a row drive circuit that scans gate lines, connected to the active elements in a row direction, to supply drive signals, thereby writing the video signals to the pixels. In a horizontal blanking period in a predetermined horizontal period, the row drive circuit drives the active elements in a predetermined row that is different from a row to which the video signals are written in the horizontal period, and the data-line drive circuit supplies a first predetermined fixed-level signal to all the data lines in the horizontal blanking period to write the fixed-level signal to pixels in a corresponding row.

According to an aspect of the invention, the data-line drive circuit and the row drive circuit scan the pixels, arranged in a matrix, in the horizontal direction and in the vertical direction, respectively, to write video signals. After a predetermined time, (e.g., one-half a frame period in embodiments described below), the first predetermined fixed-level signal is written for each row and the processing is repeated in the vertical direction. Thus, since the first predetermined fixed-level signal is written to pixels to which video signals have been written, display by pixels based on video signals is restricted by the above-mentioned predetermined time. It is, therefore, possible to arbitrarily set the ratio between display based on video signals and display based on the first predetermined fixed-level signal.

In the display apparatus according to an aspect of the invention, preferably, the row drive circuit delays the vertical-direction scanning for writing the video signals by a predetermined amount of time and writes the first predetermined fixed-level signal to all pixels in a row specified by the vertical-direction scanning delayed by the predetermined amount of time, in a predetermined time in the horizontal blanking period, thereby performing display. According to an aspect of the invention, display by pixels based on video signals is restricted by the above-mentioned predetermined time. It is, therefore, possible to arbitrarily set the ratio between display based on video signals and display based on the first predetermined fixed-level signal. For example, when the above-mentioned predetermined time is reduced, the time of display based on video signals is reduced to thereby allow a reduction in residual image. Also, when the predetermined time is increased, the time of display based on video signals is increased.

In the display apparatus according to an aspect of the invention, preferably, the predetermined amount of time is determined in accordance with a scene-mode switching signal or a movement amount of an entire image expressed by the video signals, and in the horizontal blanking period, the row drive circuit drives the active elements with delay of the predetermined amount of time. According to an aspect of the invention, since the timing of writing the first predetermined fixed-level signal is adjusted in accordance with the scene-mode switching signal (e.g., a signal specifying a video genre, such as a movie or sport) or the movement amount of an entire image expressed by the video signals, the ratio between display based on video signals and display based on the first predetermined fixed-level signal can be appropriately set in accordance with video content. In particular, when display based on the first predetermined fixed-level signal is excessive, flicker is likely to occur. However, according to an aspect of the invention, since display based on the first predetermined fixed-level signal is set in accordance with video content, the occurrence of flicker is minimized.

In the display apparatus according to an aspect of the invention, the data-line drive circuit may supply video signals containing the first predetermined fixed-level signal to the data lines. With this arrangement, output control for switching video signals and the second predetermined fixed-level signal is not required in the present invention.

In the display apparatus according to an aspect of the invention, the data-line drive circuit may supply video signals containing the first predetermined fixed-level signal and a second predetermined fixed-level signal to the data lines.

In the display apparatus according to an aspect of the invention, preferably, after supplying the first predetermined fixed-level signal to the data lines, the data-line drive circuit supplies the second predetermined fixed-level signal.

In the display apparatus according to an aspect of the invention, the data-line drive circuit may include a data-line selection circuit for sequentially selecting the data lines; and switching elements that are driven, in accordance with a fixed-level write signal generated in the horizontal blanking period and outputs from the data-line selection circuit, to supply the first predetermined fixed-level signal, the second predetermined fixed-level signal, and video signals to the data lines. The drive circuit may include a first row selection circuit and a row selection circuit that scan the gate lines to drive the active elements. The first row selection circuit may sequentially scan the gate lines to drive the active elements, thereby writing the second predetermined fixed-level signal and video signals to the pixels. The second row selection circuit may start the vertical-direction scanning with delay of a predetermined amount of time relative to the first row selection circuit, to scan the gate lines to drive the active elements at timing when the switching elements are driven in accordance with the fixed-level write signal to cause the first predetermined fixed-level signal to be supplied to the data lines, thereby writing the first predetermined fixed-level signal to the pixels.

In the display apparatus according to an aspect of the invention, the data-line drive circuit includes a data-line selection circuit for sequentially selecting the data lines; and switching elements that are driven, in accordance a first fixed-level write signal and a second fixed-level signal generated in the horizontal blanking period and outputs from the data-line selection circuit, to supply the first predetermined fixed-level signal, the second predetermined fixed-level signal, and video signals to the data lines. The row drive circuit may include a first row selection circuit and a second row selection circuit that scan the gate lines to drive the active elements. The first row selection circuit may sequentially scan the gate lines to drive the active elements, thereby writing the first predetermined fixed-level signal, the second predetermined fixed-level signal, and the video signals to the pixels. The second row selection circuit may start the vertical-direction scanning with delay of a predetermined amount of time relative to the first row selection circuit, to sequentially scan the gate lines to drive the active elements at timing when the switching elements are driven in accordance with the first fixed-level write signal to cause the first predetermined fixed-level signal to be supplied to the data lines, thereby writing the first predetermined fixed-level signal to the pixels.

In the display apparatus according to an aspect of the invention, preferably, the predetermined amount of time is determined in accordance with a scene-mode switching signal or a movement amount of an entire image expressed by the video signals, and the second row selection circuit starts the vertical-direction scanning with delay of the predetermined amount of time.

The display apparatus according to an aspect of the invention may further includes a light-control unit for controlling an amount of emission light of the display apparatus, thereby adjusting the amount of emission light in accordance with a scene-mode switching signal or a movement amount of an entire image expressed by the video signals. In general, when the ratio of display based on the first fixed-level signal is increased, an image displayed by the liquid crystal array becomes dark. However, according to as aspect of the invention, such an event can be prevented, since the amount of emission light is adjusted in accordance with the scene-mode switching signal or the movement amount of an entire image expressed by the video signals.

The display apparatus according to an aspect of the invention may further includes a gamma corrector or a gain adjuster to adjust a gamma curve or gain in accordance with a scene-mode switching signal or a movement amount of an entire image expressed by the video signals. In general, when the ratio of display based on the first fixed-level signal is increased, an image displayed by the liquid crystal array becomes dark. However, according to an aspect of the invention, such an event can be prevented, since the gamma curve or gain is adjusted in accordance with the scene-mode switching signal or the movement amount of an entire image expressed by the video signals.

The display apparatus according to an aspect of the invention may further includes a video-signal processor for supplying the video signals to the data-line drive circuit.

DESCRIPTION OF THE PREFERRED EMBODIMENTS

First Embodiment

Figure 1:
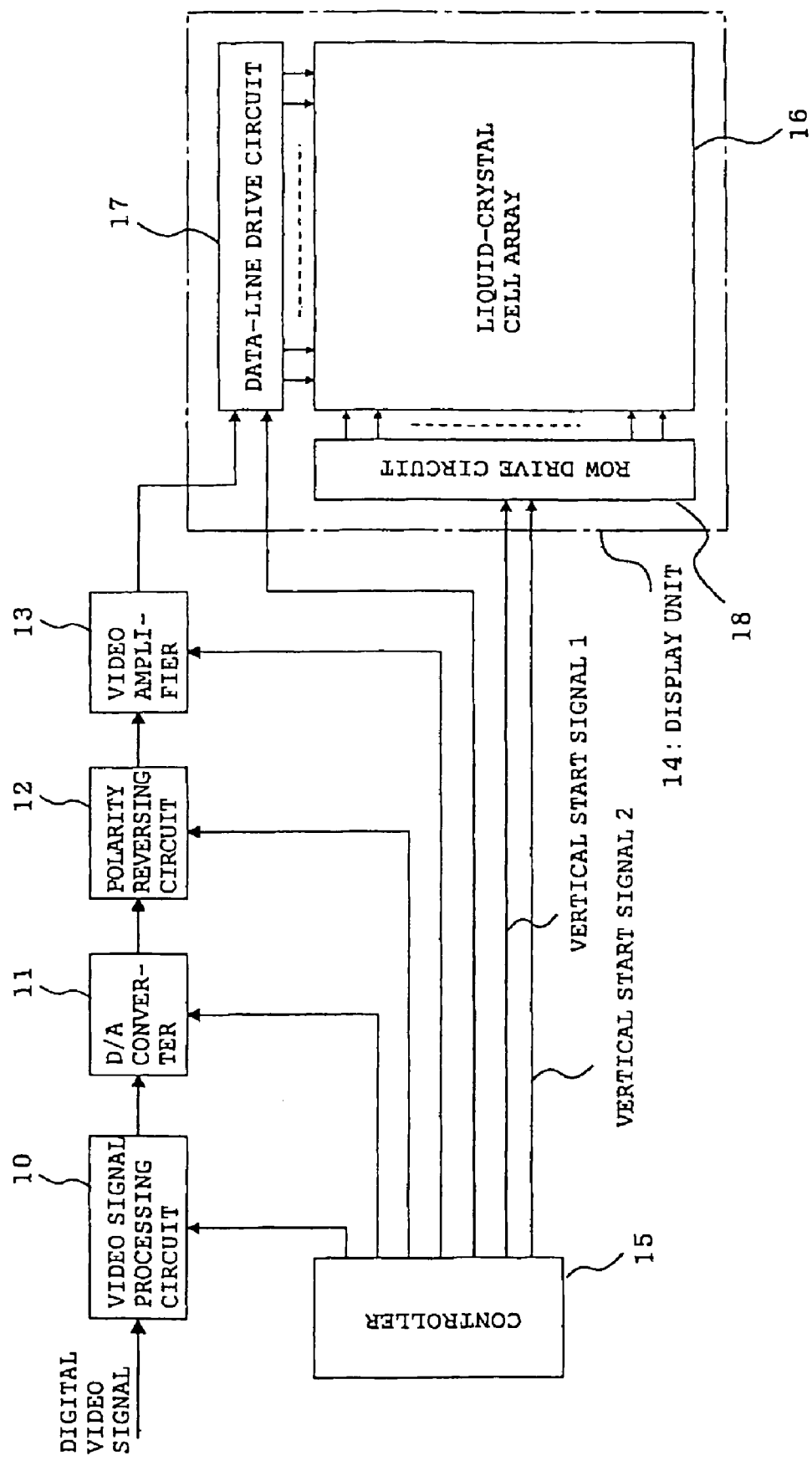
FIG. 1 a block diagram of a display apparatus according to a first embodiment of the present invention.

FIG. 1 is a block diagram of a display apparatus according to a first embodiment of the present invention. This display apparatus is applied to, for example, an electronic apparatus, such as a liquid-crystal projector, and includes a video-signal processing circuit 10, a digital-to-analog (D/A) converter 11, a polarity reversing circuit 12, a video amplifier 13, a display unit 14, and a controller 15. The video-signal processing circuit 10, the D/A converter 11, the polarity reversing circuit 12, and the video amplifier 13 correspond to a video-signal processor in the present invention. The display unit 14 includes a liquid-crystal cell array 16, a data-line drive circuit (source driver) 17, and a row drive circuit (gate driver) 18. The liquid-crystal cell array 16 has a structure in which, for example, liquid-crystal material is sandwiched between two laminated transparent substrates, such as glass substrates. Thin-film transistors (TFTs) are provided as active elements for liquid crystal cells (pixels). The liquid-crystal cell array 16 modulates light from a light source (not shown) and a projection unit (not shown) displays the modulated light on a screen in an enlarged manner.

The controller 15 controls the entire apparatus. That is, the controller 15 supplies clock signals and control signals to the video-signal processing circuit 10, the D/A converter 11, the polarity reversing circuit 12, the video amplifier 13, and the display unit 14, thereby controlling the entire apparatus. The video-signal processing circuit 10 receives digital video signals, performs various types of correction processing such as gamma correction, and outputs the resulting signals. The D/A converter 11 converts the corrected video signals into analog signals. The polarity reversing circuit 12 reverses the polarity of the video signals, converted into the analog signals, for example, for each line, and outputs the resulting signals to the video amplifier 13. The video amplifier 13 amplifies the video signals and outputs the amplified video signals to the data-line drive circuit 17. The controller 15 supplies a horizontal start signal, a horizontal clock signal, an enable signal, and a fixed-level write signal to the data-line drive circuit 17 and supplies vertical start signals 1 and 2, a vertical clock signal, and a row-selection-circuit switching signal to the row drive circuit 18. The data-line drive circuit 17 and the row drive circuit 18 in the display unit 14 control the liquid crystal cells in the liquid-crystal cell array 16, as described below.

Figure 2:
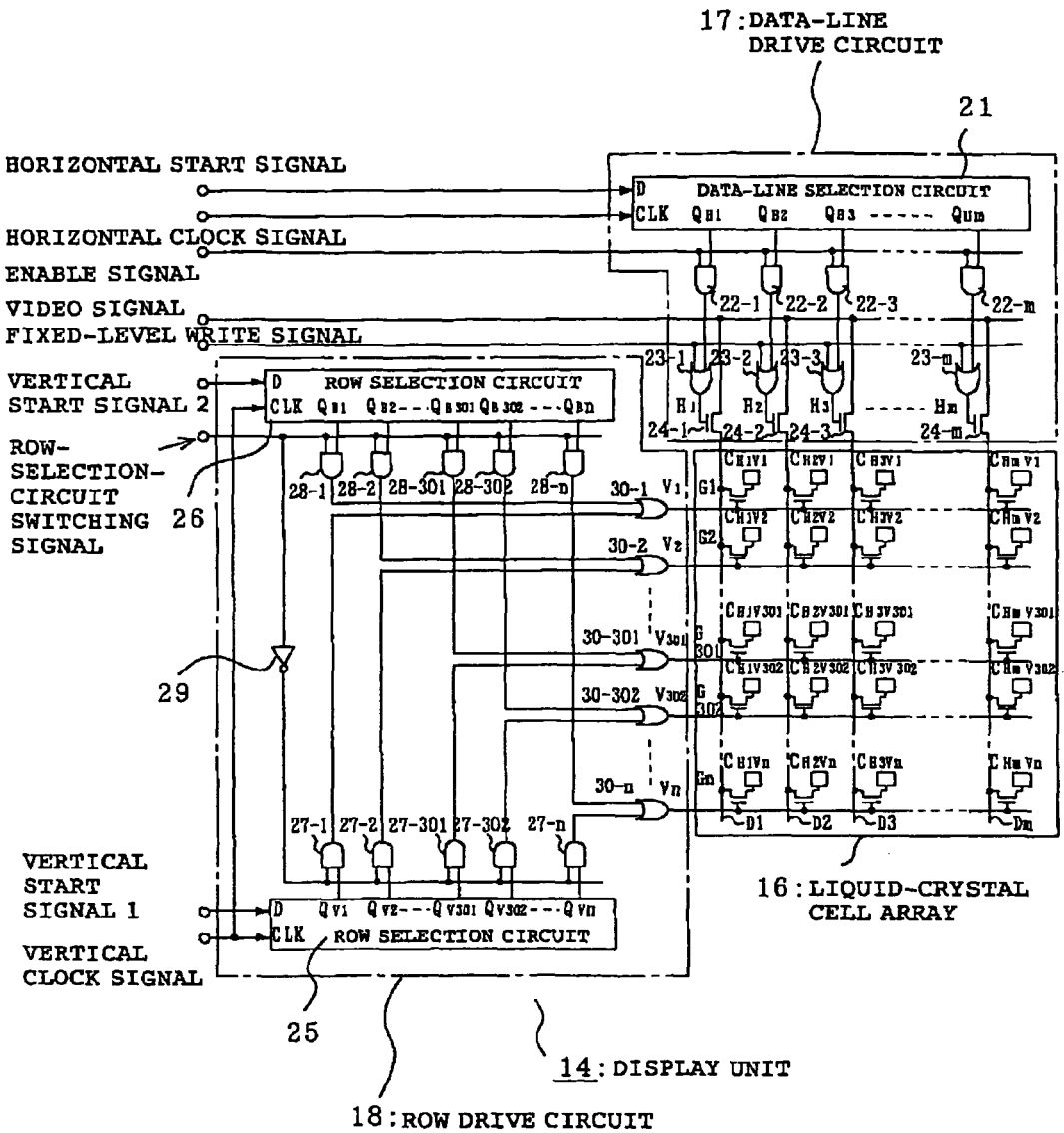
FIG. 2 is a circuit diagram showing details of a display unit.
Figure 3:
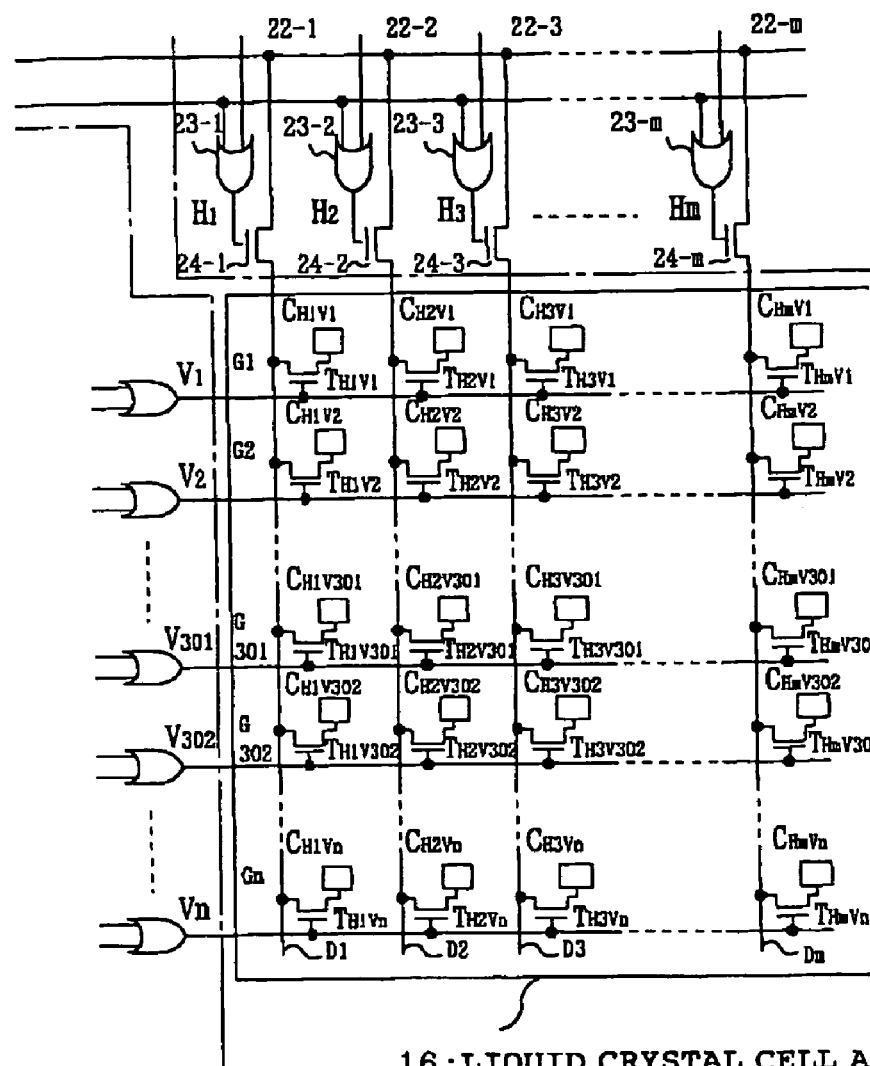
FIG. 3 is a diagram showing details of a liquid-crystal cell array.

FIG. 2 is a circuit diagram showing details of the display unit 14. FIG. 3 is a detailed diagram of the liquid-crystal cell array 16. The liquid-crystal cell array 16 includes liquid crystal cells CH1V1, CH2V1, ..., and CHmVn, which are arranged in a matrix, and thin-film transistors (TFTs) TH1V1, TH2V1, ..., and THmVn, which drive the respective liquid crystal cells CH1V1, CH2V1, ..., and CHmVn. Data lines D1 D2, ..., and Dm are connected to the sources of the thin-film transistors TH1V1, TH1V2, ... arranged in corresponding columns. Gate lines G1, G2, ..., and Gn are connected to the gates of the thin film transistors TH1V1, TH2V1, ... arranged in corresponding rows. The data-line drive circuit 17 includes a data-line selection circuit 21, AND circuits (AND gates) 22-1, 22-2, ..., and 22-*m*, OR circuits (OR gates) 23-1, 23-2, ..., 23-*m*, and switching transistors 24-1, 24-2, ..., and 24-*m*.

The data-line selection circuit 21 includes, for example, shift registers. Upon receiving the horizontal start signal, the data-line selection circuit 21 sequentially outputs the horizontal start signal to the output terminals QH1, QH2, ..., and QHm in synchronization with the horizontal clock signal. The AND circuits 22-1, 22-2, ..., and 22-*m* determine the AND logics of the enable signal and signals from the output terminals QH1, QH2, ..., and QHm (i.e., open/close the gates based on the enable signal). The OR circuits 23-1, 23-2, ..., and 23-*m* receive outputs from the AND circuits 22-1, 22-2, ..., and 22-*m* and the fixed level write signal, and supply the outputs to the gates of the switching transistors 24-1, 24-2, ..., and 24-*m*. When the switching transistors 24-1, 24-2, ..., and 24-*m* are turned on, the video signals are sequentially supplied to the data lines D1, D2, ..., and Dm. The fixed level write signal serves as a timing signal for supplying a signal having a black level corresponding to a first predetermined fixed level and a signal having a precharge level corresponding to a second predetermined fixed level, the signals being contained in the video signals. The precharge level is a level between a white level and a black level and is suitable for a characteristic of the liquid-crystal cell array 16 used.

The row drive circuit 18 includes a first row selection circuit 25, a second row selection circuit 26, AND circuits 27-1, 27-2, ..., and 27-*n* and 28-1, 28-2, ..., and 28-*n*, an inverter 29, and OR circuits (OR gates) 30-1, 30-2, ..., and 30-*n*. The row selection circuits 25 and 26 include shift registers. The vertical start signal 1 and the vertical clock signal are supplied to the first row selection circuit 25, which, in turn, sequentially outputs the vertical start signal 1 to output terminals QV1, QV2, ..., QVn in synchronization with the vertical clock signal. The vertical start signal 2 and the vertical clock signal are supplied to the second row selection circuit 26, which, in turn, sequentially outputs the vertical start signal 2 to output terminals QB1, QB2, ..., and QBn in synchronization with the vertical clock signal. The AND circuits 27-1, 27-2, ..., and 27-*n* determine the AND logics of outputs from the row selection circuit 25 and signals inverted, by the inverter 29, from the row-selection circuit switching signal, and output the resulting signals to the OR circuits 30-1, 30-2, ..., and 30-*n*. The AND circuits 28-1, 28-2, ..., and 28-*n* determine the AND logics of outputs from the row selection circuit 26 and the row-selection-circuit switching signal and output the resulting signals to the OR circuits 30-1, 30-2, ..., and 30-*n*.

Figure 4:
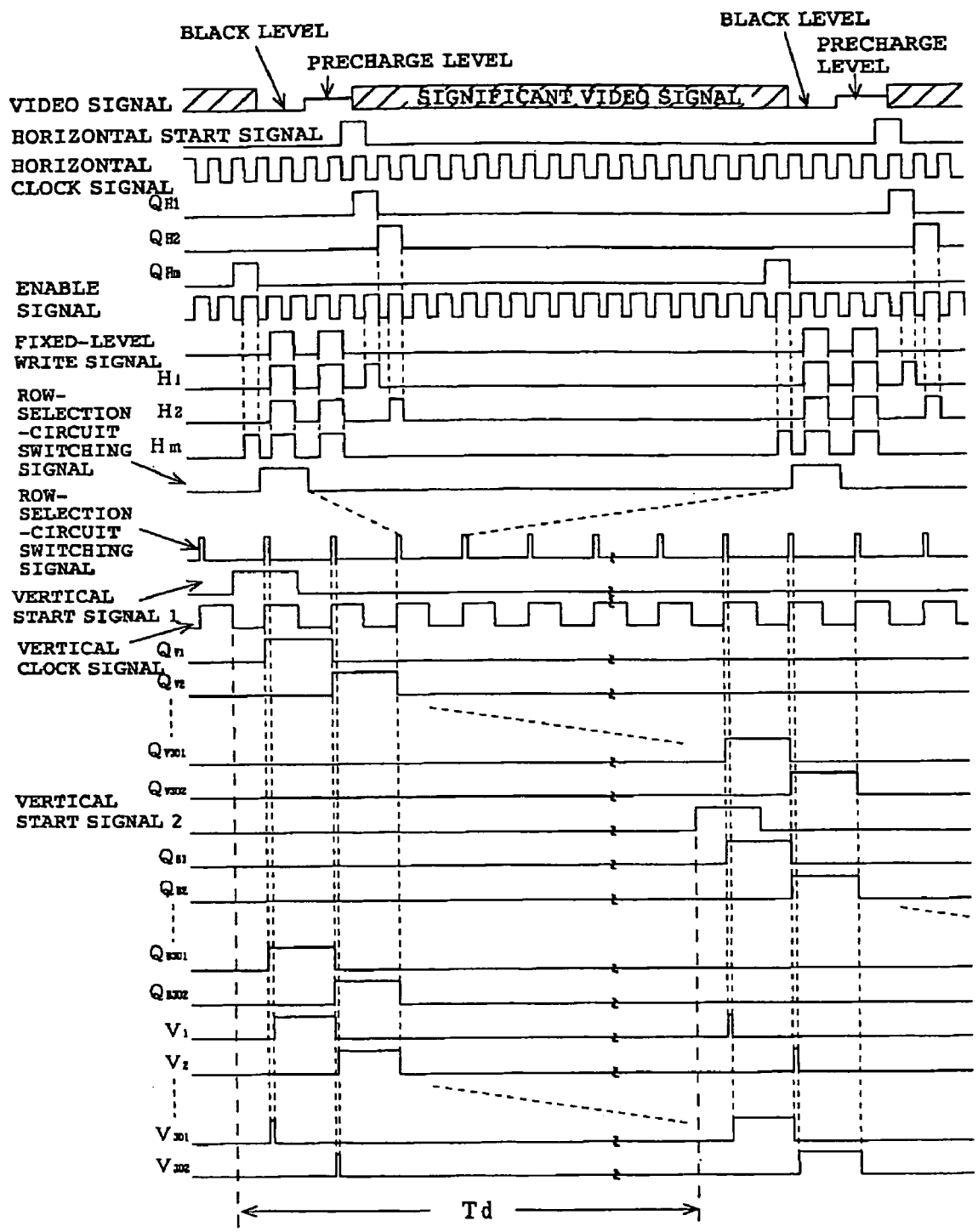
FIG. 4 is a timing chart of signals of individual units of the display unit shown in FIGS. 2 and 3.

FIG. 4 is a timing chart showing the operation of the display unit 14 shown in FIGS. 2 and 3. The operation of the display unit 14 will now be described with reference to FIG. 4. Video signals supplied from the video amplifier 13 contain, in addition to significant video signals, a black level signal and a precharge-level at timing corresponding to a horizontal blanking period. When the horizontal start signal is supplied to the data-line selection circuit 21, the data-line selection circuit 21 sequentially outputs the pulse of the horizontal start signal to the output terminals QH1, QH2, ..., and QHm in synchronization with the horizontal clock signal. The AND circuit 22-1, 22-2, ..., and 22-*m* determine the AND logics of outputs from the data-line selection circuit 21 and the enable signal and output the resulting signals to the OR circuits 23-1, 23-2, ..., and 23-*m*. In addition to the outputs from the AND circuits 22-1, 22-2, ..., and 22-*m*, the fixed-level write signal is input to the OR circuits 23-1, 23-2, and 23-*m*. The fixed-level write signal has a pulse with timing corresponding to the black-level and precharge-level signals contained in video signals. Thus, outputs H1, H2, ..., and Hm from the OR circuits 23-1, 23-2, ..., and 23-*m* contain the pulse of the fixed-level write signal in a horizontal blanking period and outputs from the AND circuits 22-1, 22-2, ..., 22-*m* in another time period. The outputs H1, H2, ..., and Hm from the OR circuits 23-1, 23-2, ..., and 23-*m* turn on the switching transistors 24-1, 24-2, ..., and 24-*m*, so that the video signals are supplied to the data lines D1, D2, ..., and Dm. Thus, of the video signals, the precharge level signal and the black level signal in the horizontal blanking period are simultaneously supplied to all the data lines D1, D2, ..., and Dm, but significant video signals are sequentially supplied to the data lines D1, D2, ..., and Dm in accordance with the outputs from the data-line selection circuit 21.

The vertical start signal 1 and the vertical clock signal are supplied to the row selection circuit 25, which, in turn, sequentially outputs the vertical start signal 1 to the output terminals QV1, QV2, ..., and QVn in synchronization with the vertical clock signal. The row-selection-circuit switching signal is supplied at the black level timing of video signals. The AND circuits 27-1, 27-2, ..., and 27-*n* determine the AND logics of outputs appeared at the output terminals QV1, QV2, ..., and QVn of the row selection circuit 25 and the inverted signal of the row-selection-circuit switching signal, and output the resulting signals to the OR circuits 30-1, 30-2, ..., and 30-*n*. As a result, the outputs from the row selection circuit 25 and the inverted signal of the row-selection-circuit switching signal are sequentially supplied to the gate lines G1, G2, ..., and Gn as gate voltages. Thus, while being scanned in the horizontal direction, the thin-film transistors TH1V1, TH2V1, ..., and THmVn are scanned in the vertical direction to be driven. Thus, the video signals (the precharge level signal and the significant video signals) are supplied to the liquid crystal cells CH1V1, CH2V2, ..., and CHmVn to thereby render video. The term "significant video signals" herein refer to video signal portions used for intended display.

The vertical start signal 2 and the vertical clock signal are supplied to the row selection circuit 26, which, in turn, sequentially outputs the vertical start signal 2 to the output terminals QB1, QB2, ..., and QBn in synchronization with the vertical clock signal. In the first embodiment, the vertical start signal 2 is generated at timing delayed by one-half a frame period relative to the vertical start signal 1. As described above, the row-selection-circuit switching signal is supplied at the timing of the black-level signal contained in video signals. The AND circuits 28-1, 28-2, . . . and **28-*n* determine the AND logics of outputs appeared at the output terminals QB1, QB2, . . . and QBn of the row selection circuit 26 and the row-selection-circuit switching signal and output the resulting signals to the OR circuits 30-1, 30-2, . . . , and 30-*n***. As a result, gate voltages are sequentially supplied to the gate lines G1, G2, . . . , and Gn. Thus, while being scanned in the horizontal direction in an across-the-board manner, the thin-film transistors TH1V1, TH2V1, . . . , and THmVn are scanned in the vertical direction to be driven. Thus, a video signal (the black level signal) is supplied to the liquid crystal cells CH1V1, CH2V2, . . . , and CHmVn to thereby render black video.

As described above, the OR circuits 30-1, 30-2, . . . , and **30-*n* receive the signals from the row selection circuits 25 and 26 and output the signals. Thus, for example, when attention is paid to an output V1 of the OR circuit 30-1, the OR circuit 30-1 outputs a signal corresponding to the vertical start signal 1 supplied from the output terminal QV1 of the row selection circuit 25, so that a gate voltage is supplied to the gate line G1 to put the thin-film transistors TH1V1 to THmV1 into drive states. As a result, video signals (the precharge level signal and the significant video signals) are supplied to the liquid crystal cells CH1V1 to CHmV1 to thereby render video for one line. Such processing is likewise repeated for the gate line G2 and subsequent lines, so that video is rendered. When attention is paid to the output V1 of the OR circuit 30-1 after one-half a frame period elapses, a signal corresponding to the row-selection-circuit switching signal is output to thereby supply a gate voltage to the gate line G1. Consequently, the thin-film transistors TH1V1 to THmV1 are simultaneously put into the drive states and a video signal (the black level signal) is simultaneously supplied to the liquid crystal cells CH1V1 to CHmV1, so that black is rendered as video for one line. In other words, when attention is paid to the liquid crystal cells CH1V1 to CHmV1, the precharge level signal and significant video signals are supplied and written to the one line and the black level signal is supplied and written in an across-the-board manner after the elapse of one-half a frame period. Such processing is likewise repeated for the gate line G2 and the subsequent gate lines. As a result, video as shown in FIG. 5** is provided.

Figure 5:
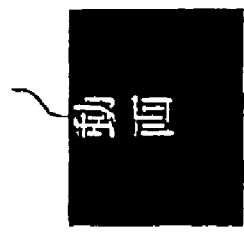
FIG. 5 is a block diagram showing display transition of the display unit shown in FIGS. 2 and 3.
Figure 5:
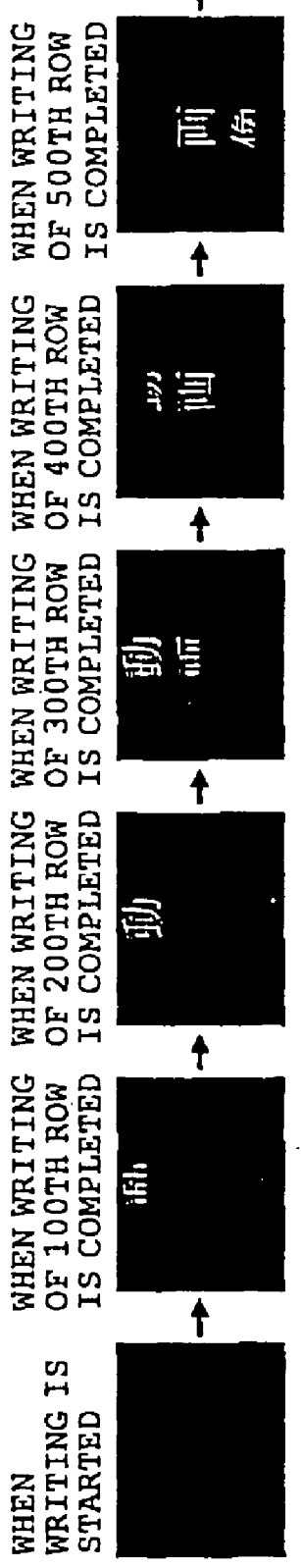
Figure 5:
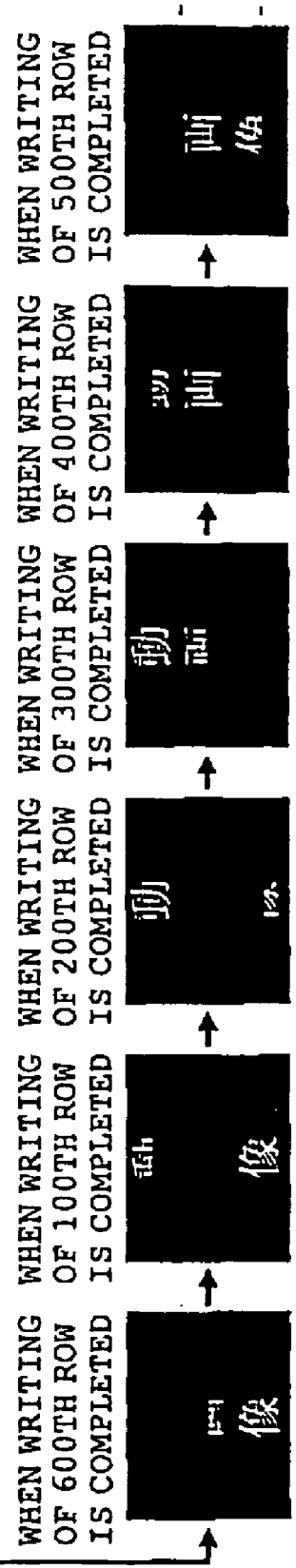

FIG. 5 is a view illustrating display transition of the display unit 14 shown in FIGS. 2 and 3. In this case, the display unit 14 is assumed to have 600 rows (n=600). Video displayed by the liquid-crystal cell array 16 is, for example, a character "moving image". When significant video signals are written from the 1st row to the 300th row, significant video signals are sequentially written to the 301st and subsequent rows in the same manner and the black-level signal is also written to the 1st and subsequent rows. Thus, when writing to the 400th row is completed, the black level signal is written to the first 1st to 100th rows and the 401st to 600th rows and significant video signals are written to the 101st to 400th rows. When writing to the 500th row is completed, the black level signal is written to the 1st to 200th rows and significant video signals are written to the 201st to 500th rows. Similarly, significant video signals and the black level signal are written, so that significant video signals for 300 rows are written to the liquid-crystal cell array 16 and the resulting video is displayed.

As described above, in the first embodiment, the liquid crystal cells arranged in a matrix are scanned in the horizontal direction and the vertical direction to write video signals, and this method is the same as a typical video-signal display method. In this state, if nothing is done until the next frame, the display based on the video signals is maintained until the next frame. However, in the first embodiment, after one-half a frame period, the black-level signal is written to the liquid crystal cells for each row and the processing is repeated in the vertical direction. Thus, since the black level signal is written to the liquid crystal cells to which video signals have been written, display by the liquid crystal cells based on video signals is restricted by the above-mentioned predetermined time. It is, therefore, possible to arbitrarily set the ratio between display based on video signals (significant video signals) and display based on the black level signal.

In the first embodiment, since the black level signal is simultaneously written for each row, the writing processing can be completed in a short time in a horizontal blanking period. Further, a video signal is set to be at a first predetermined fixed level according to the present invention during a predetermined time in the horizontal blanking period, and the fixed level (black level) signal of the video signal is used to prevent the generation of a residual image. This arrangement, therefore, can eliminate output-control for switching between video signals (significant video signals) and the black level signal.

In addition, in the present embodiment, since two signals, i.e., the black-level signal and the precharge level signal, are written with the fixed-level write signal, the circuit configuration is simplified.

Second Embodiment

Figure 6:
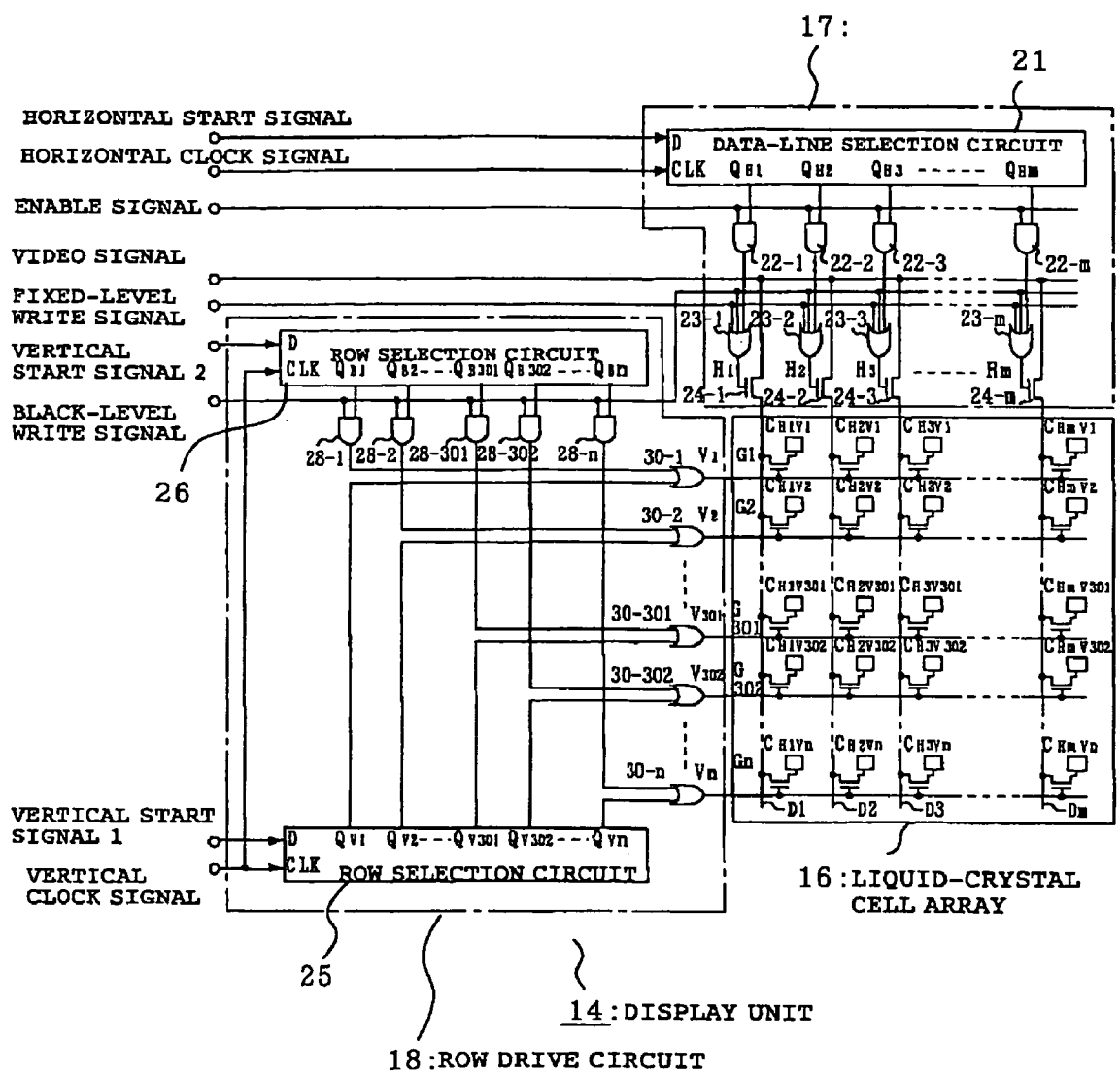
FIG. 6 is a circuit diagram of the configuration of a display unit according to a second embodiment of the present invention.

FIG. 6 is a circuit diagram showing the configuration of a display unit according to a second embodiment of the present invention. The configuration of a liquid-crystal cell array 16 shown in FIG. 6 is the same as the one shown in FIG. 3 and thus is not illustrated. In comparison with the first embodiment described above, in the display unit according to the second embodiment, the row-selection-circuit switching signal is not used, but instead, a black level write signal is input to the OR circuits 23-1, 23-2, . . . , and **23-*m* and AND circuits 28-1, 28-2, . . . , and 28-*n*. Further, the AND circuits 27-1, 27-2, . . . , and 27-*n* and the inverter 29** are eliminated. The black level write signal (a first fixed-level write signal) is a pulse signal used to write a black level signal and the fixed-level write signal (a second fixed-level write signal) is a pulse signal used to write a precharge level signal.

Figure 7:
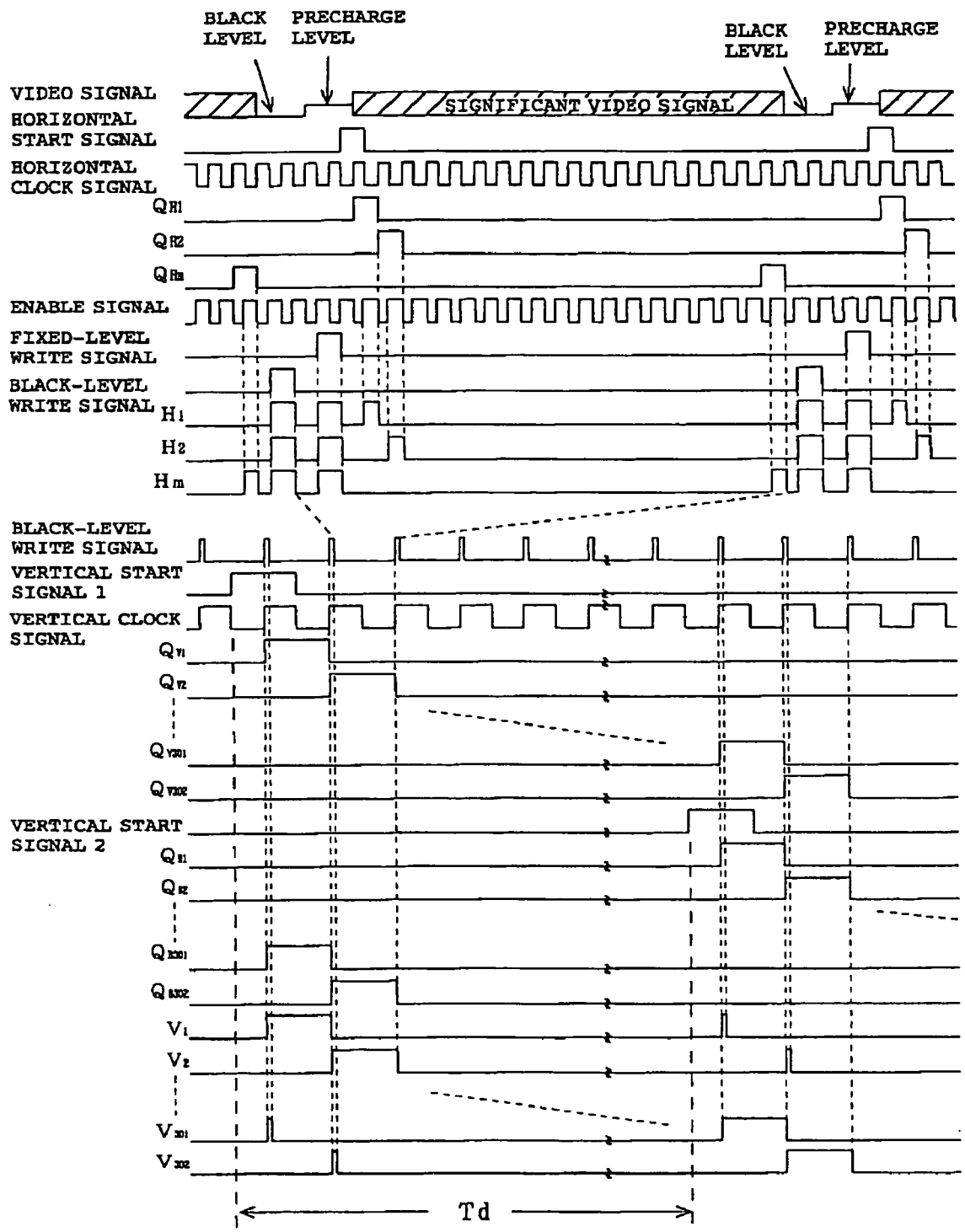
FIG. 7 is a timing chart of signals of individual units of the display unit shown in FIG. 6.

FIG. 7 is a timing chart showing the operation of the display unit 14 shown in FIG. 6. The operation of the display unit 14 shown in FIG. 6 will now be described with reference to FIG. 7. Video signals supplied from the video amplifier 13 contain, in addition to significant video signals, a black level signal and a precharge-level signal at timing corresponding to a horizontal blanking period. When the horizontal start signal is supplied to the data-line selection circuit 21, the data-line selection circuit 21 sequentially outputs the pulse of the horizontal start signal to the output terminals QH1, QH2, . . . , and QHm in synchronization with the horizontal clock signal. The AND circuit 22-1, 22-2, . . . , and **22-*m* determine the AND logics of outputs from the data-line selection circuit 21 and the enable signal and output the resulting signals to the OR circuits 23-1, 23-2, . . . , and 23-*m*. In addition to the outputs from the AND circuits 22-1, 22-2, . . . , and 22-*m*, a black-level write signal (a first fixed-level write signal) and a fixed-level write signal (a second fixed-level write signal) are input to the OR circuits 23-1, 23-2, and 23-*m*. The black-level write signal has a pulse with timing corresponding to the black-level signal and the fixed-level write signal has a pulse with timing corresponding to the precharge-level signal. Thus, outputs H1, H2, . . . , and Hm from the OR circuits 23-1, 23-2, . . . , and 23-*m*** contain the pulses of the black-level write signal and the fixed-level write signal in a horizontal blanking period and outputs from the AND circuits 22-1, 22-2, ..., 22-m in a period after the elapse of the horizontal blanking period. The outputs H1, H2, ..., and Hm from the OR circuits 23-1, 23-2, ..., and 23-m turn on the switching transistors 24-1, 24-2, ..., and 24-m, so that the video signals are supplied to the data lines D1 to Dm. Thus, of the video signals, the black level signal and the precharge level signal in the horizontal blanking period are simultaneously supplied to all the data lines D1, D2, ..., and Dm, but significant video signals are sequentially supplied to the data lines D1, D2, ..., and Dm in accordance with the outputs from the data-line selection circuit 21.

The vertical start signal 1 and the vertical clock signal are supplied to the row selection circuit 25, which, in turn, sequentially outputs the vertical start signal 1 to the output terminals QV1, QV2, ..., and QVn in synchronization with the vertical clock signal. The outputs from the row selection circuit 25 are supplied to the OR circuits 30-1, 30-2, ..., and 30-n. As a result, in a time period other than the horizontal blanking period, gate voltages are sequentially supplied to the gate lines G1, G2, ..., and G2. Thus, while being scanned in the horizontal direction, the thin-film transistors TH1V1, TH2V1, ..., and THmVn are scanned in the vertical direction to be driven. Thus, video signals (the fixed-level signal, the precharge level signal, and the significant video signals) are supplied to the liquid crystal cells CH1V1, CH2V2, ..., and CHmVn to thereby render video.

The vertical start signal 2 and the vertical clock signal are supplied to the row selection circuit 26, which, in turn, sequentially outputs the vertical start signal 2 to the output terminals QV1, QV2, ..., and QVn in synchronization with the vertical clock signal. In the second embodiment, the vertical start signal 2 is also generated at timing delayed by one-half a frame period relative to the vertical start signal 1. As described above, the black-level write signal is supplied at the black-level timing of video signals. The AND circuits 28-1, 28-2, ... and 28-n determine the AND logics of outputs appeared at the output terminals QB1, QB2, ... and QBn of the row selection circuit 26 and the black-level write signal and output the resulting signals to the OR circuits 30-1, 30-2, ..., and 30-n. As a result, gate voltages are sequentially supplied to the gate lines G1, G2, ..., and Gn in the horizontal, blanking period. Thus, while being scanned in the horizontal direction in an across-the-board manner, the thin-film transistors TH1V1, TH2V1, ..., and THmVn are scanned in the vertical direction to be driven. Thus, a video signal (the black level signal) is supplied to the liquid crystal cells CH1V1, CH2V2, ..., and CHmVn to thereby render black video.

As described above, the timing of the ON operation of the thin film transistors TH1V1 to THmVn is the same as that in the embodiment shown in FIG. 4, except that the black level signal is written before the precharge level signal is written. As in the same manner shown in FIG. 5, video signals for 300 rows are written to the liquid crystal array 16 and the black-level signal for 300 rows is written, so that corresponding video is displayed. In the second embodiment, since the precharge level signal is written after the black level signal is written to the liquid crystal cells, the precharge level is stably written.

Third Embodiment

In the first and second embodiments, the descriptions have been given of examples in which the vertical start signal 2 is delayed from the vertical start signal 1 by one-half a frame period to display video on one-half a screen. In the present invention, however, arbitrarily setting the amount of time delay of the vertical start signal 2 relative to the vertical start signal 1 allows the ratio of display based on video signals (significant video signals) to be set to an arbitrary value. For example, when the amount of time delay of the vertical start signal 2 relative to the vertical start signal 1 is set to one-third the frame period, video is displayed on one third of the screen. When the amount of time delay of the vertical start signal 2 relative to the vertical start signal 1 is set to two-third the frame period, video is displayed on two third of the screen. A shorter time period of display based on video signals (significant video signals) has a greater effect on moving-image blur, but provides darker video. In practice, therefore, the balance of the factors is considered to determine the delay time of the vertical start signal 2. A description is now given of fourth to ninth embodiments in which the delay time of the vertical start time 2 relative to the vertical start time 1 is automatically adjusted in accordance with, for example, the movement amount of an entire image.

Fourth Embodiment

Figure 8:
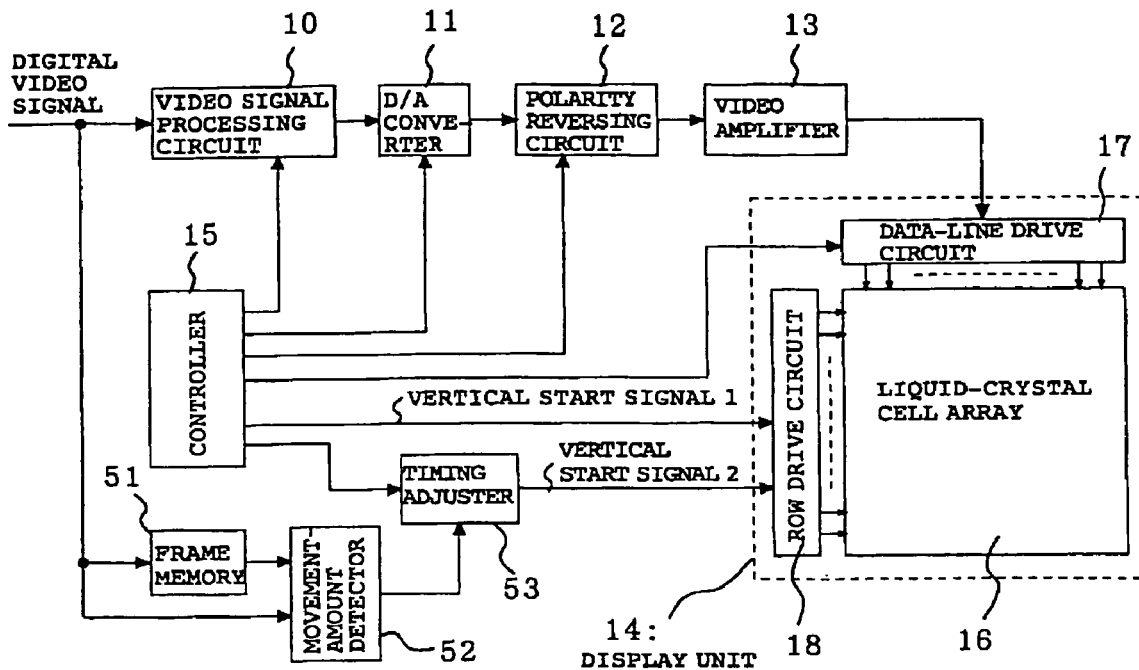
FIG. 8 is a block diagram of a display apparatus according to a fourth embodiment of the present invention.

FIG. 8 is a block diagram of a display apparatus according to a fourth embodiment of the present invention. In comparison with the first embodiment shown in FIG. 1, this display apparatus further includes a frame memory 51, a movement-amount detector 52, and a timing adjuster 53. Video signals are supplied to the frame memory 51, so that a frame image is loaded thereinto. The movement-amount detector 52 detects the movement amount of an entire image in accordance with the video signals of the frame image loaded in the frame memory 51 (i.e., past video signals) and current video signals. An example of a detection method for the movement-amount detector 52 to detect the movement amount of an entire image will now be described. For example, an image for one frame is divided into a plurality of blocks, each including m×n pixels (m and n are integers of 2 or more). With respect to each block, a motion vector between two frames (between a frame image in the frame memory 51 and a frame image based on current video signals) is determined, so that the movement amount thereof is determined. Then, the sum of the determined movement amounts of blocks is determined. The sum corresponds to the movement amount of entire images between two frames. The motion vector for one block can be obtained by determining the amount of shift in the gravity coordinates of pixel data (brightness data) contained in the block. Although the frame memory 51 is illustrated as an independent block in this case, it may be incorporated into the video-signal processing circuit 10.

The entire-image movement amount detected by the movement-amount detector 52 is supplied to the timing adjuster 53. Based on the entire-image movement amount, the timing adjuster 53 adjusts the timing of outputting the vertical start signal 2 in accordance with a characteristic described below and shown in FIG. 9.

Figure 9:
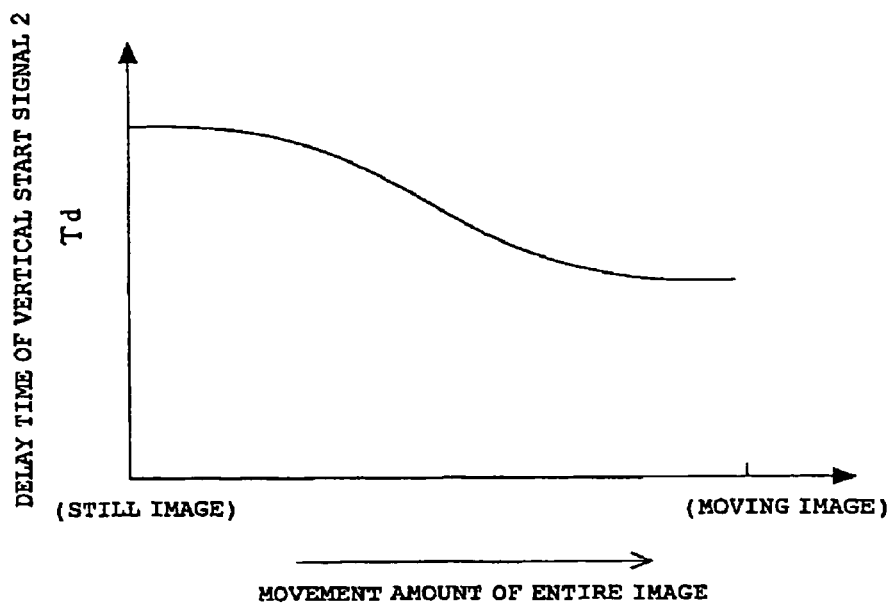
FIG. 9 is a graph showing the movement amount of an entire image versus the delay time of a vertical start signal 2.

FIG. 9 is a graph showing the movement amount of an entire image versus the delay time of the vertical start signal 2 relative to the vertical start signal 1. As shown in FIG. 9, as the movement amount of an entire image decreases, the delay time Td (refer to FIGS. 4, 5, and 7) of the vertical start signal 2 relative to the vertical start signal 1 is increased to thereby increase the rate of a display period relative to the vertical scanning period, so that the amount of display for one image is increased. Also, as the movement amount of an entire image increases, the delay time Td of the vertical start signal 2 relative to the vertical start signal 1 is reduced to thereby reduce the rate of the display period relative to the vertical scanning period. As a result, the amount of display for one screen is reduced and the generation of moving-image blur is reduced.

Fifth Embodiment

Figure 10:
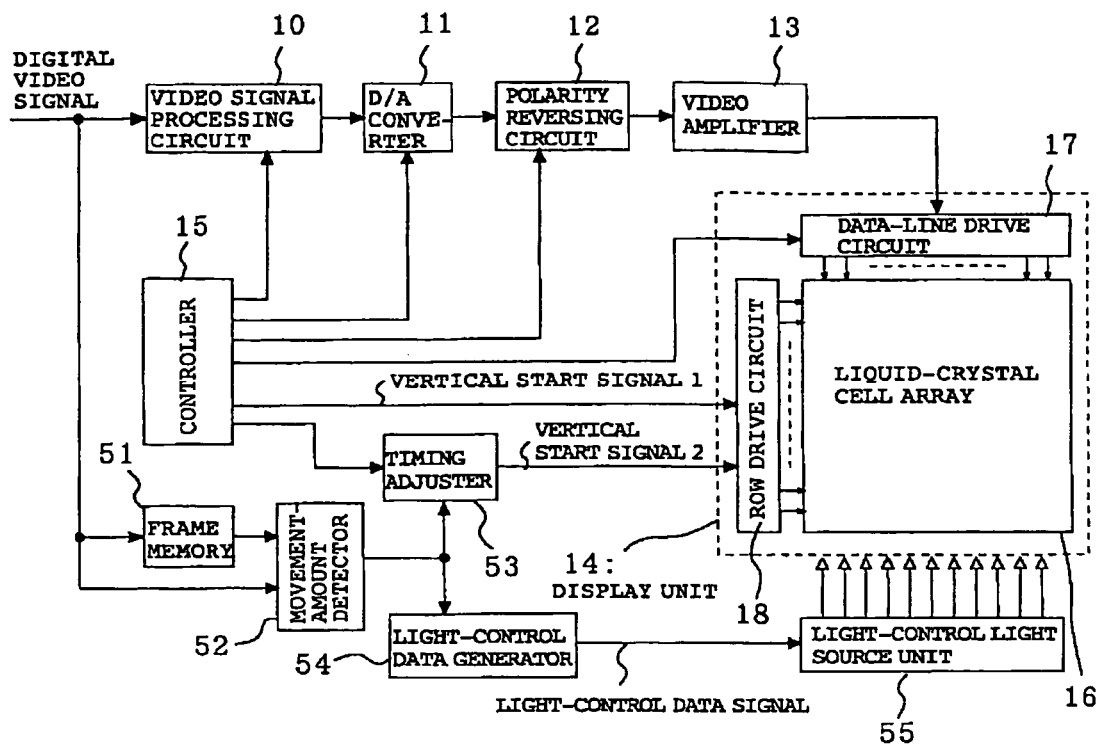
FIG. 10 is a block diagram of a display apparatus according to a fifth embodiment of the present invention.

FIG. 10 is a block diagram of a display apparatus according to a fifth embodiment of the present invention. In comparison with the fourth embodiment shown in FIG. 8, this display apparatus further has a light-control data generator 54 and a light-control light-source unit 55. In accordance with a characteristic described below and shown in FIG. 11, the light-control data generator 54 generates a light-control data signal corresponding to the movement amount of an entire image and outputs the light-control data signal to the light-control light-source unit 55. Based on the light-control data signal, the light-control light-source unit 55 adjusts the amount of light of a light source, adjusts drive current for an LED used to serve as an auxiliary light source, or adjusts the angle of a louver, to thereby adjust the amount of emission light.

Figure 11:
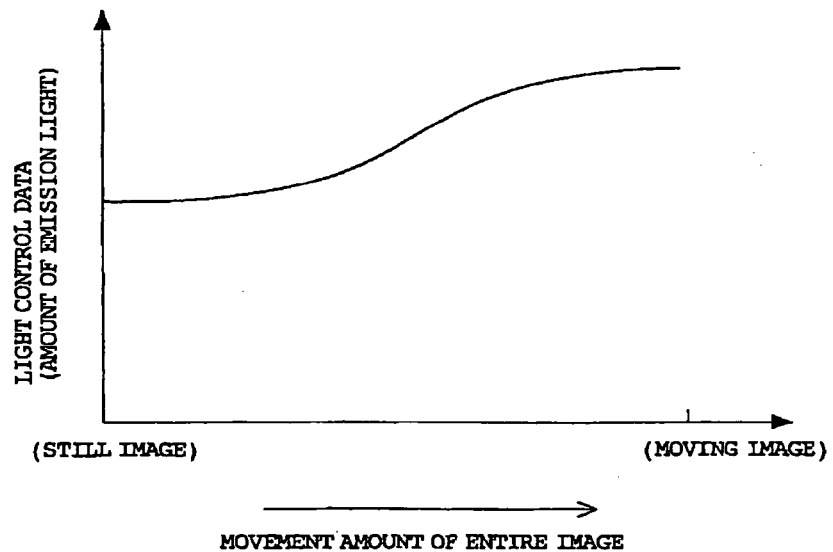
FIG. 11 is a graph showing the movement amount of an entire image versus light-control (brightness) data.

FIG. 11 is a graph showing the movement amount of an entire image versus light-control data (the amount of emission light). This graph shows a characteristic in which the amount of light-control data is increased according to an increase in the movement amount of an entire image. As described above, as the movement amount of an entire image increases, the delay time Td of the vertical start signal 2 relative to the vertical start signal 1 is reduced to thereby reduce the amount of display for one screen (i.e., the amount of display based on video signals), so that movement-image blur is reduced. Thus, although the screen of the display unit 14 inevitably becomes dark according to a decrease in the amount of display on one screen, the light-control light-source unit 55 adjusts the amount of light (the amount of emission light) in accordance with a light-control data signal obtained based on the characteristic shown in FIG. 11, to thereby prevent the screen of the display unit 14 from becoming dark even when the movement amount of an entire is large.

Sixth Embodiment

Figure 12:
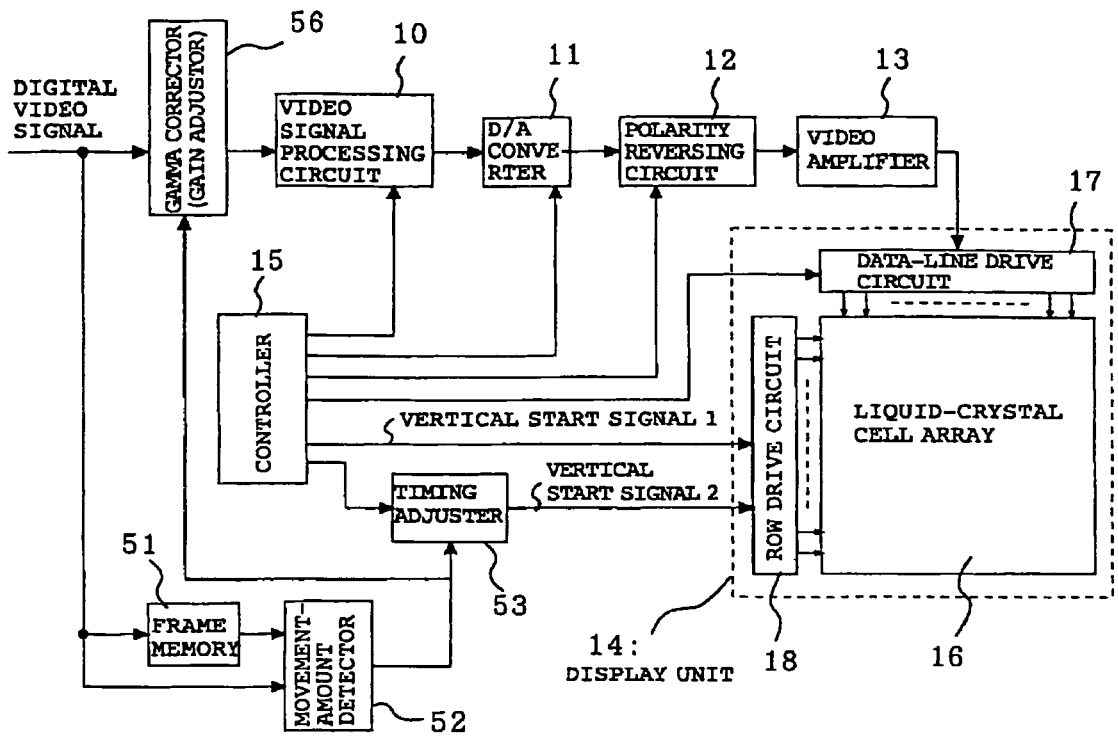
FIG. 12 is a block diagram of a display apparatus according to a sixth embodiment of the present invention.
Figure 13:
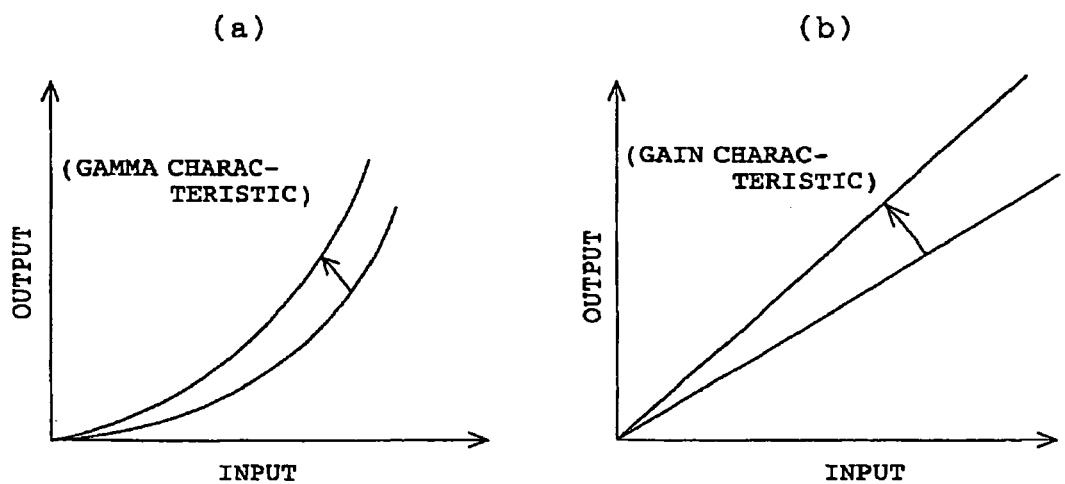
FIGS. 13A and 13B are graphs showing characteristics of a gamma corrector and a gain adjuster, respectively.

FIG. 12 is a block diagram of a display apparatus according to a sixth embodiment of the present invention. In comparison with the fourth embodiment shown in FIG. 8, this display apparatus further has a gamma corrector (gain adjuster) 56. The gamma corrector (gain adjuster) 56 is controlled by an output (the movement amount) supplied from the movement-amount detector 52. The gamma corrector (gain adjuster) 56 may be incorporated into the video-signal processing circuit 10. In the sixth embodiment, however, the gamma corrector (gain adjuster) 56 is illustrated as an independent block in order to emphasize the presence of the gamma corrector (gain adjuster) 56. As shown in FIGS. 13A and 13B, the gamma corrector (gain adjuster) 56 increases the gamma characteristic or gain in accordance with the movement amount of an entire image.

FIGS. 13A and 13B are graphs showing characteristics of the gamma corrector/gain adjuster 56. As shown, in accordance with the movement amount of an entire image, the gamma curve is adjusted in the direction in which its gain increases, or a gain is adjusted in the increase direction. As described above, a larger movement amount of an entire image can darken the screen of the display unit 14. In the sixth embodiment, however, the brightness level of video signals is increased to increase the brightness of the screen. This arrangement, therefore, prevents the screen of the display unit 14 from becoming dark, even when the movement amount of an entire image is large.

Seventh Embodiment

Figure 14:
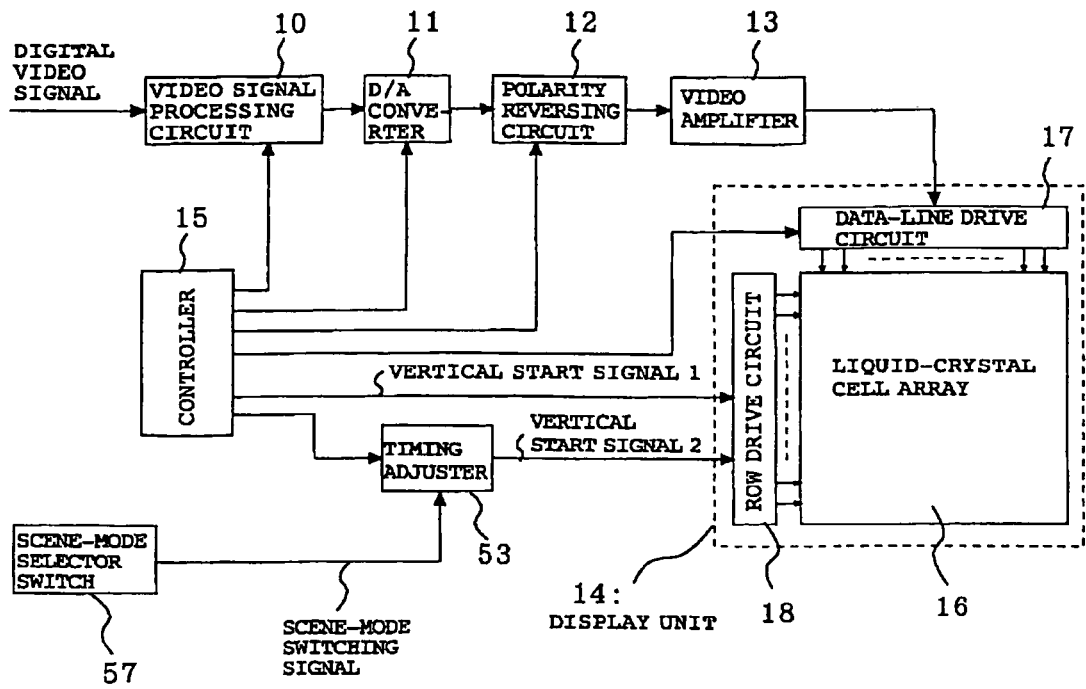
FIG. 14 is a block diagram of a display apparatus according to a seventh embodiment of the present invention.

FIG. 14 is a block diagram of a display apparatus according to a seventh embodiment of the present invention. In comparison with the fourth embodiment shown in FIG. 8, this display apparatus has a configuration in which the frame memory 51 and the movement-amount detector 52 are eliminated. Instead, a scene-mode selector switch 57 supplies a scene-mode switching signal to the timing adjuster 53 and, based on the signal, the timing adjuster 53 adjusts the generation timing of the vertical start signal 2. Examples of the scene-mode switching signal include a signal corresponding to sport, a signal for a movie (DVD), and a signal corresponding to a presentation. In the case of sport, since a moving image is to be displayed, the timing adjuster 53 adjusts the generation timing of the vertical start signal 2 so as to correspond to large movement of an entire image. In the case of a presentation, since a still image is to be displayed, the timing adjuster 53 adjusts the generation timing of the vertical start signal 2 so as to correspond to small movement of an entire image. Further, in the case of a movie (DVD), the timing adjuster 53 adjusts the generation timing of the vertical start signal 2 so as to give priority to a moving image or so as to correspond to a desired video source. In this manner, since the timing adjuster 53 adjusts the generation timing of the vertical start signal 2 in accordance with the scene-mode switching signal supplied from the scene-mode selector switch 57, adequate processing corresponding to video content is achieved.

Eighth Embodiment

Figure 15:
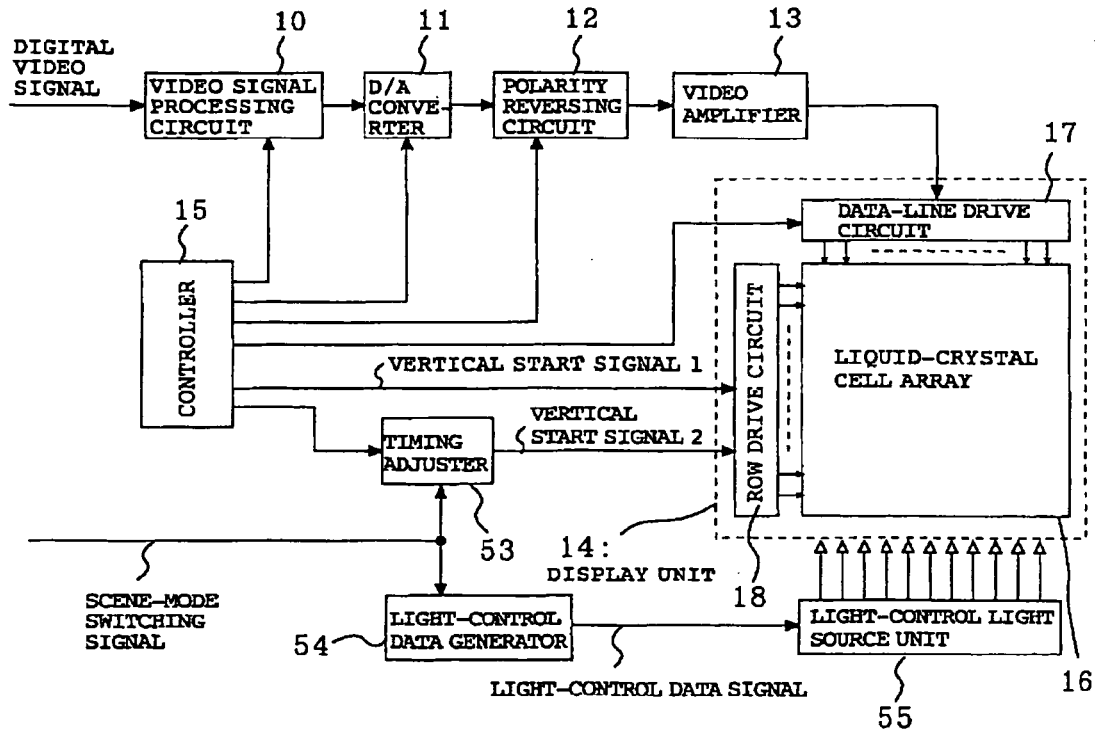
FIG. 15 is a block diagram of a display apparatus according to an eighth embodiment of the present invention.

FIG. 15 is a block diagram of a display apparatus according to an eighth embodiment of the present invention. In comparison with the seventh embodiment shown in FIG. 14, this display apparatus further includes a light-control data generator 54 and a light-control light-source unit 55. Also, in comparison with the fifth embodiment shown in FIG. 10, the display apparatus of the eight embodiment uses the scene-mode switching signal supplied from the scene-mode selector switch 57, in stead of the movement amount of an entire image, and operates in the same manner as the one in the fifth embodiment shown in FIG. 10. However, although the generation timing of the vertical start signal 2 in the case of the fifth embodiment shown in FIG. 10 changes periodically, the generation timing of the vertical start signal 2 in the eighth embodiment corresponds to the scene-mode switching signal.

Ninth Embodiment

Figure 16:
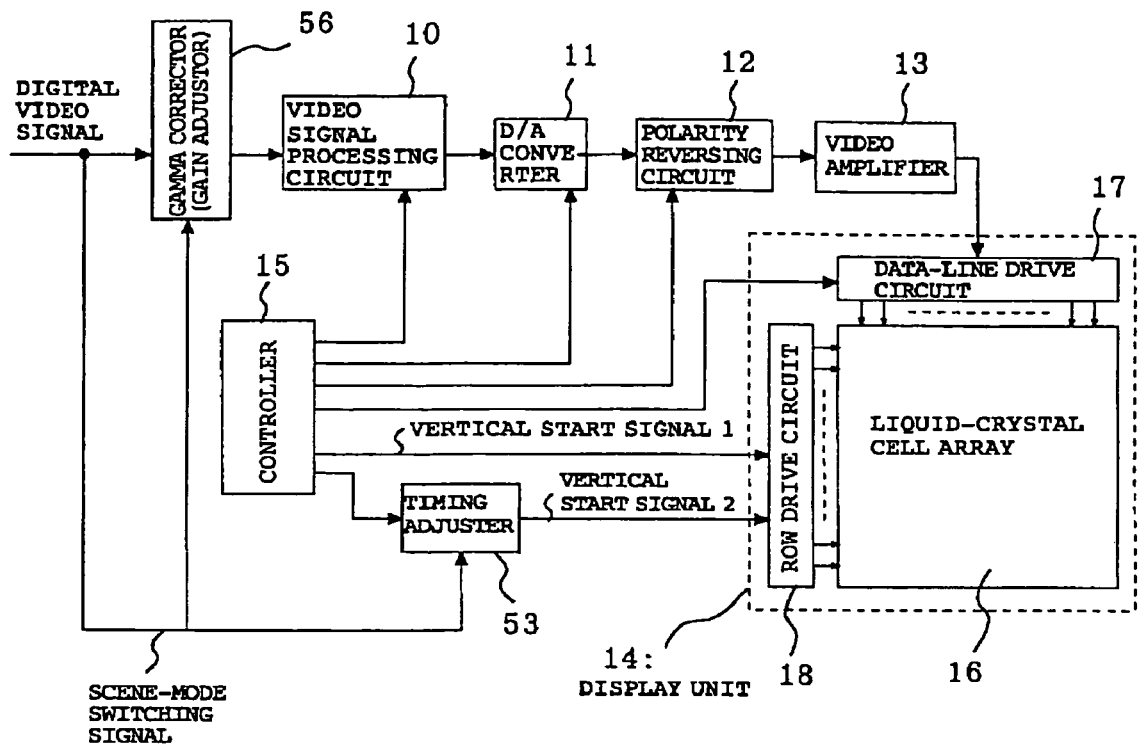
FIG. 16 is a block diagram of a display apparatus according to a ninth embodiment of the present invention.

FIG. 16 is a block diagram of a display apparatus according to a ninth embodiment of the present invention. In comparison with the eighth embodiment shown in FIG. 15, this display apparatus has a configuration in which the light-control data generator 54 and the light-control light-source unit 55 are eliminated and a gamma corrector (gain adjuster) 56 is added. Also, in comparison with the sixth embodiment shown in FIG. 12, the display apparatus of the ninth embodiment uses the scene-mode switching signal supplied from the scene-mode selector switch 57, in stead of the movement amount of an entire image, and operates in the same manner as the one in the sixth embodiment shown in FIG. 12. However, although the generation timing of the vertical start signal 2 in the case of the sixth embodiment shown in FIG. 12 changes periodically, the generation timing of the vertical start signal 2 in the ninth embodiment corresponds to the scene-mode switching signal.

Tenth Embodiment

Although an example in which the generation timing of the vertical start signal 2 is adjusted in accordance with the movement amount of an entire image or the scene-mode switching signal has been described in the fourth to ninth embodiments, the present invention is not limited thereto. For example, the scene-mode switching signal and the movement amount of an entire image may be combined to perform processing, such as adjusting the generation timing of the vertical start signal 2.

Eleventh Embodiment

Although an example of a transmissive-type array that utilizes light from a light source to display video has been described as the liquid-crystal cell array 16, the present invention is not limited thereto. For example, the present invention can be applicable to a reflective-type array that has a reflector and that utilizes incident light from outside to display video. The present invention is also applicable to a transflective-type device that has a transflector on the inner surface of a display panel and that utilizes the characteristics of the reflective-type and transflective-type devices to display video. In addition, the present invention is applicable to not only a display apparatus that projects video on a screen but also a display panel for direct viewing.

Twelfth Embodiment

Figure 17:
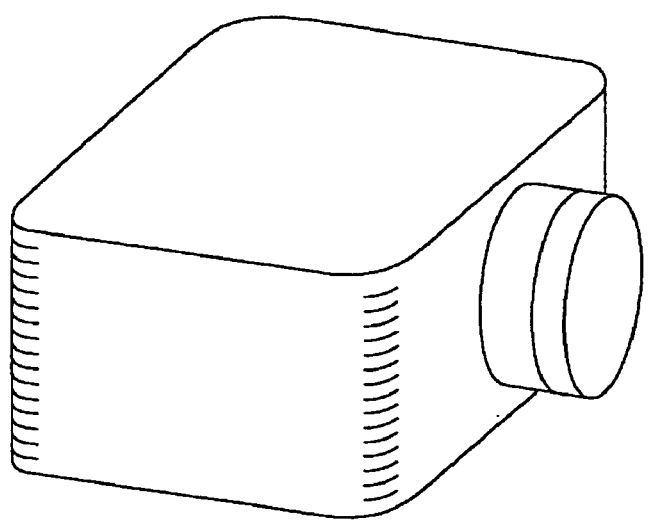
FIG. 17 is a view showing an example of a liquid crystal projector applying the display apparatus.

FIG. 17 is a schematic view of an example of a liquid crystal projector applying the display apparatus of one of the embodiments described above. A display apparatus according to the present invention is applicable to various electronic apparatuses, such as personal computers, mobile telephones, PDAs, and so on, as well as liquid crystal projectors.

What is claimed is:

1. A liquid crystal display, comprising:
a liquid-crystal cell array having a plurality of sets, the sets being configured by pixels and TFTs for driving the pixels respectively;
a data-line drive circuit that scans data lines connected to the TFTs to supply video signals including a black-level signal and a pre-charge level signal in a horizontal blanking period; and
a row drive circuit that scans gate lines connected to the TFTs to supply a drive signal, thereby writing the video signals to the pixels, wherein:
the data-line drive circuit supplies the black level signal to all the data lines simultaneously in a first period of the horizontal blanking period, supplies the pre-charge level signal to all the data lines simultaneously in a second period of the horizontal blanking period, and successively supplies the image signals excluding the black level and the pre-charge level signals in a horizontal period after the horizontal blanking period;
the row drive circuit includes a first row selection circuit and a second row selection circuit;
the first row selection circuit scans the gate lines, writes the black-level signal to all the pixels in the scanned lines simultaneously and then writes the pre-charge level signal to all the pixels in the scanned lines simultaneously, and successively writes the image signals excluding the black-level and the pre-charge level signals to the pixels in the scanned lines; and
the second row selection circuit starts to scan the gate lines with delay of a predetermined time relative to the first row selection circuit, scans the gate lines only in a time corresponding to the first period of the horizontal blanking period, and writes the black-level signal to all the pixels in the scanned lines simultaneously in the first period of the horizontal blanking period.

2. The liquid crystal display apparatus according to claim 1, wherein the predetermined time is determined according to a movement amount of an entire image expressed by video signals or scene mode switching signals.

3. The liquid crystal display apparatus according to claim 1, further comprising a light-control unit for controlling an amount of emission light of the liquid crystal display apparatus, thereby adjusting the amount of emission light in accordance with a scene-mode switching signal or a movement amount of an entire image expressed by the video signals.

4. The liquid crystal display apparatus according to claim 1, further comprising a gamma corrector or a gain adjustor to adjust a gamma curve or gain in accordance with a scene-mode switching signal or a movement amount of an entire image expressed by the video signals.

5. A display method for a liquid crystal display apparatus having a liquid-crystal cell array having a plurality of sets, the sets being configured by pixels and TFTs for driving the pixels respectively, a data-line drive circuit that scans data lines connected to the TFTs to supply video signals including a black-level signal and a pre-charge level signal in a horizontal blanking period, and a row drive circuit that scans gate lines connected to the TFTs to supply a drive signal, thereby writing the video signals to pixels, the row drive circuit includes a first row selection circuit and a second row selection circuit, the method comprising:
supplying the black level signal to all the data lines simultaneously in a first period of the horizontal blanking period with the data-line drive circuit;
supplying the pre-charge level signal to all the data lines simultaneously in a second period of the horizontal blanking period with the data-line drive circuit; and
successively supplying the image signals excluding the black-level and the pre-charge level signals in a horizontal period after the horizontal blanking period with the data-line drive circuit;
scanning the gate lines with the first row selection circuit;
writing the black-level signal to all the pixels in the scanned lines simultaneously with the first row selection circuit;
writing the pre-charge level signal to all the pixels in the scanned lines simultaneously with the first row selection circuit;
successively writing the image signals excluding the black-level and the pre-charge level signals to the pixels in the scanned lines with the first row selection circuit;
starting to scan the gate lines with delay of a predetermined time relative to the first row selection circuit with the second row selection circuit;
scanning the gate lines only in a time corresponding to the first period of the horizontal blanking period with the second row selection circuit; and
writing the black-level signal to all the pixels in the scanned lines simultaneously in the first period of the horizontal blanking period with the second row selection circuit.

* * * * *